Sept. 11, 1962      W. P. DUNCAN      3,053,295
METHOD OF PRODUCING BEVEL SIDING
Filed July 6, 1960
FIG. 1 -CONVENTIONAL METHOD-
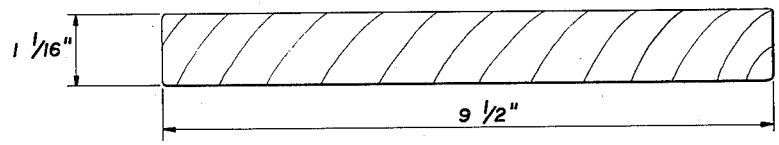
FIG. 2
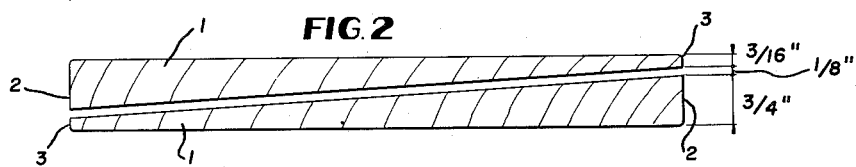
FIG. 3 - NEW METHOD -
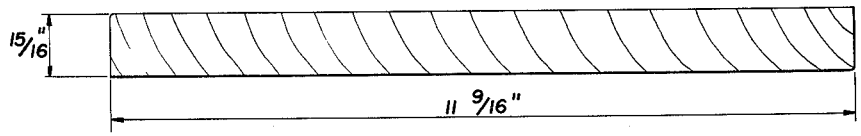
FIG. 4
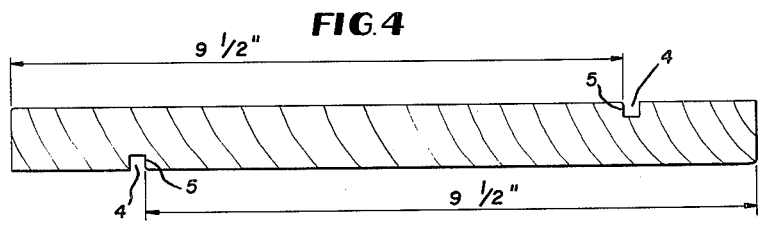
FIG. 5
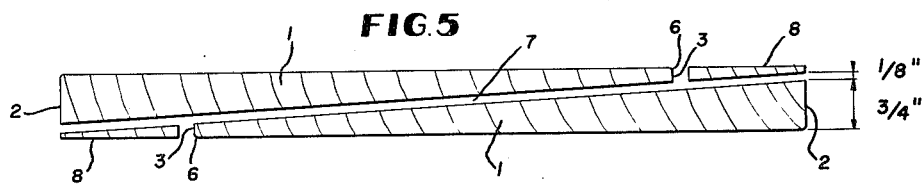
INVENTOR.
WILLIAM PAUL DUNCAN
BY *Albert H. Kirchner*
ATTORNEY

United States Patent Office 3,053,295
Patented Sept. 11, 1962

3,053,295
METHOD OF PRODUCING BEVEL SIDING
William Paul Duncan, 11309 2nd Ave. NW.,
Seattle, Wash.
Filed July 6, 1960, Ser. No. 41,056
3 Claims. (Cl. 144—326)

The present invention relates to the production of bevel siding used in the construction of exterior walls of wooden buildings, and its principal object is to provide a new method by which the boards of standard dimensions can be sawed to produce standard siding more economically than by the prior art methods.

The invention achieves this object and other related advantages by a sequence of process steps by which boards of standard size, available at all sawmills, can be cut by the simplest kind of apparatus, such as is found in even the most economically equipped lumber factories, to produce conventional, standard siding at substantial savings in cost of material and cost of cutting.

More specifically the invention provides a method by which standard bevel siding 9½ inches wide having a butt thickness of ¾ inch and a tip thickness of 3/16 inch can be made from standard 1 x 12 inch boards at less than the cost of the present practice of producing such siding from special 1¼ x 10 inch boards.

The invention is capable of being practiced in terms of other dimensions but for the sake of illustrating its principles it will be explained in a preferred embodiment, as practiced in the foregoing specific form, in the following specification and the accompanying drawing, in which:

FIGURE 1 is a side elevational view of a board dressed or surfaced to the dimensions required for sawing into two piece of bevel siding by the standard prior art method;

FIG. 2 is a side elevational view of the same board after being sawed into two pieces of bevel siding;

FIG. 3 is a side elevational view of a board dressed or surfaced to the dimensions required for cutting into two pieces of bevel siding by the method of the present invention;

FIG. 4 is a side elevational view of the board of FIG. 3 after being grooved in accordance with the first step of the method; and FIG. 5 is a side elevational view of the board of FIGS. 3 and 4 after the final step of sawing by which the two pieces of bevel siding are produced.

Referring to FIGS. 1 and 2, the standard prior art method of producing two pieces of 9½" bevel siding 1 having a thickness of ¾" at the butt 2 and a thickness of 3/16" at the tip 3 consists in starting with a board, generally of cedar or equivalent appropriate wood, having an undressed width of 10" and thickness of 1¼". This is a special size which is available, at relatively high cost, only at certain sawmills which specialize in supplying manufacturers of bevel siding. This board is surfaced or dressed by trimming the four sides in a standard planer to the net dimensions of 9½" x 1 3/16" shown in FIG. 1. The dressed board is then resawed diagonally, as shown in FIG. 2, to produce the two identical bevel siding pieces 1, 1, each having a butt thickness of ¾" and a tip thickness of 3/16", and each having the full 9½" width of the board. The saw cut is ⅛" in thickness.

As has been stated, boards of untrimmed dimensions of 1¼" x 10" are not standard and are not universally available. However, they constitute the most economical material from which bevel siding pieces of the desired 9½" x ¾" x 3/16" can be made by the prior art method of FIGS. 1 and 2 which, it will be noted, requires dressed boards having a thickness equal to the combined thicknesses of the butt, tip and dividing saw kerf, i.e., 12, 3 and 2 sixteenths inch, or 1 1/16".

A universally standard thickness in which untrimmed cedar and equivalent appropriate boards can be obtained at all sawmills is one inch. The present invention utilizes such boards. They are obtained in a width of 12", which is a standard width and cost less than the 10" wide boards of special 1¼" thickness required by the prior art method, as will be shown hereinafter.

In accordance with the principles of the invention, a 1" x 12" board is dressed or trimmed in a standard planer to a net thickness of 15/16" and a net width of 11 9/16", as shown in FIG. 3. This, it will be appreciated, is thinner than the thickness of ⅛" saw kerf plus the combined butt and tip thicknesses of the ultimate pieces, and is 2 1/16" wider than the 9½" width of the piece.

The trimmed board of FIG. 3 is next subjected to a double grooving operation the effect of which is shown in FIG. 4. In this step of the process a groove 4 of more or less ⅛" width and slightly more than 3/16" depth is milled into each opposite side of the board transversely along an edge margin, spaced inwardly from the adjacent edge by a distance equal to the distance by which the width of the board exceeds the width in which the bevel siding piece is to be produced. More accurately stated, in more significant terms, however, because the inner side 5 of each groove will constitute the tip edge of one of the two pieces of siding to be ultimately produced, the spacing of this inner side 5 of each groove 4 must be exactly 9½" from the opposite edge of the board, as shown in FIG. 4. The depth of the groove must be slightly more than the thickness of the tip edge of the finished piece, but should not exceed that thickness by more than ⅛", which is the thickness of the saw kerf by which the board will be divided into the two pieces.

The grooves are readily produced by milling or simply by passing the board over or under a saw or dado head. Milling is preferred, and the best results are produced by a milling cutter which will form the inner side of the groove with a rounded edge at its intersection with surface of the board, as shown in FIG. 4, so that the outer edge corner of the tip 3 of the final piece 1 will be rounded in accordance with the best practice, as shown at 6 in FIG. 5.

The final step in the process consists in resawing the board diagonally from edge to edge to provide the kerf 7, as shown in FIG. 5, along a plane intersecting the bottoms of the two grooves 4. The thickness of this kerf may be ⅛", as in the prior art method. It will divide the board into two bevel siding pieces 1, 1, of the required standard dimensions, and two small shim pieces 8, 8, each of which it will be noted is separated from the beveled surface of a siding piece adjacent its butt edge margin. These small beveled pieces 8 are useful as shims in aligning and truing framework members and the junctions thereof with the siding, studding, laths, etc., and for other purposes. Even if the pieces 8 are put to some use of relatively little value, such as fuel, or are discarded as waste, the net economic effect is a saving in cost as compared with the prior art method of FIGS. 1 and 2 where no such by-product small pieces are produced.

It will be observed that the resultant pieces of bevel siding 1, 1 produced from the standard dimension board of FIG. 3 by the new method are identical in size, shape and proportions with the bevel siding pieces 1, 1 produced by the prior art method from the boards of special dimensions shown in FIG. 1.

Typical savings gained by practice of the new method are seen from the following comparative tables showing the costs of producing one thousand feet of commercial ¾" x 10" bevel siding (net dimensions of ¾" x 9½") by the old and new methods respectively, based on current quotations in the Pacific Northwest for selected green common sound and tight knotted red cedar board suitable for making bevel siding of the kind hereinabove disclosed:

Prior Art Method

| | |
|---|---|
| Cost of 1,000 board feet of 1¼" x 10" | $85.00 |
| Lineal feet in 1,000 bd. ft. of 1¼" x 10" | 960 |
| Lineal feet of ¾" x 10" bevel siding produced | 1,920 |
| Board feet in 1,920 feet of ¾" x 10" bevel siding | 1,600 |
| Cost per 1,000 bd. ft. ($85.00 divided by 1,600) | $55.13 |
| Cost per lineal foot ($85.00 divided by 1,920) | $0.4427 |

New Method

| | |
|---|---|
| Cost of 1,000 board feet of 1" x 12" | $75.00 |
| Lineal feet in 1,000 bd. ft. of 1" x 12" | 1,000 |
| Lineal feet of ¾" x 10" bevel siding produced | 2,000 |
| Board feet in 2,000 feet of ¾" x 10" bevel siding | 1,667 |
| Cost per 1,000 bd. ft. ($75.00 divided by 1,667) | $44.99 |
| Cost per lineal foot ($75.00 divided by 2,000) | $0.375 |

In addition to the foregoing advantages of ready availability of the material and lower cost of producing the product, it may be stated that the new method is superior to the old in requiring less drying time in the seasoning of the thinner boards. The new method also provides the sawmill with downgrade material bringing higher prices than those resulting as by-products from the thicker 1¼" material. The grooving and sawing operations, which are the only method steps required in practice of the invention in addition to the surfacing operations required by both the old and new methods, can be performed by the use of simple standard equipment available to all manufacturers at low cost.

I claim:

1. The method of producing two pieces of bevel siding from lumber of rectangular cross section which comprises providing a board of rectangular cross section having a width greater than that of the desired piece and a thickness equal to the thickness of the tip of the piece plus the thickness of the piece inwardly from the butt edge a distance equal to the excess of the width of the board over that of the piece plus the thickness of a saw cut, then milling into each of the opposite side faces of the board a groove spaced from the adjacent end edge of the board a distance equal to said excess and to a depth equal to the thickness of the tip of the piece, then sawing the board diagonally from end edge to end edge along a plane intersecting the bottoms of the two grooves, thereby dividing the board into two opposed pieces of bevel siding and two diagonally opposite small shim pieces.

2. The method of producing two identical pieces of bevel siding from lumber of rectangular cross section which comprises providing a board of rectangular cross section having a width greater than that of each piece and a thickness equal to the thickness of the tip of each piece plus the thickness of each piece inwardly from its butt edge a distance equal to the excess of the width of the board over that of each piece plus the thickness of a saw cut, then milling a groove into each of the opposite side faces of the board having an inner side spaced from the opposite end edge of the board a distance equal to the width of each piece and a depth equal to the thickness of the tip of each piece, then sawing the board diagonally from end edge to end edge along a plane intersecting the bottoms of the two grooves, thereby dividing the board into two opposed pieces of bevel siding and two diagonally opposite small shim pieces.

3. The method of producing two identical pieces of bevel siding from lumber of rectangular cross section which comprises providing a board of rectangular cross section having a width greater than that of each piece and a thickness equal to the thickness of the tip of each piece plus the thickness of each piece inwardly from its butt edge a distance equal to the excess of the width of the board over that of each piece plus the thickness of a saw cut, then milling into each of the opposite sides of the board, to a depth equal to the thickness of the tip of each piece, a groove having an inner side intersecting the adjacent side of the board by a rounded edge and spaced from the opposite edge of the board a distance equal to the width of each piece, and then sawing the board diagonally from edge to edge along a plane intersecting the bottoms of the two grooves.

References Cited in the file of this patent

UNITED STATES PATENTS

| | | |
|---|---|---|
| 360,997 | Byrkit | Apr. 12, 1887 |
| 448,162 | Paine | Mar. 10, 1891 |
| 925,401 | Urquhart | June 15, 1909 |
| 1,593,800 | King | July 27, 1926 |